United States Patent

[11] 3,574,347

| [72] | Inventor | Richard E. Hughes |
| | | Venice, Calif. |
| [21] | Appl. No. | 711,304 |
| [22] | Filed | Mar. 7, 1968 |
| [45] | Patented | Apr. 13, 1971 |
| [73] | Assignee | Southwestern Industries, Inc. |
| | | Los Angeles, Calif. |

[54] MECHANICAL ACTUATOR HAVING ADJUSTABLE SPRING RATE
12 Claims, 6 Drawing Figs.

[52] U.S. Cl. .................................................. 267/162
[51] Int. Cl. .................................................. F16f 1/32
[50] Field of Search ........................................ 267/161
(V), 162 (V)

[56] References Cited
UNITED STATES PATENTS

| 3,317,252 | 5/1967 | Gassman | 267/1(62) |
| 3,366,136 | 1/1968 | Burton | 267/1(61) |

*Primary Examiner*—James B. Marbert
*Attorney*—Christie, Parker & Hale

ABSTRACT: An actuator including a resiliently biased principal actuating member which is coupled to a pair of Belleville springs adjusted to have a total spring rate equal in magnitude and opposite in value to that of the resilient bias of the principal actuating member through a predetermined deflection range of the actuating member.

INVENTOR.
RICHARD E. HUGHES
BY
Christie, Parker & Hale
ATTORNEYS.

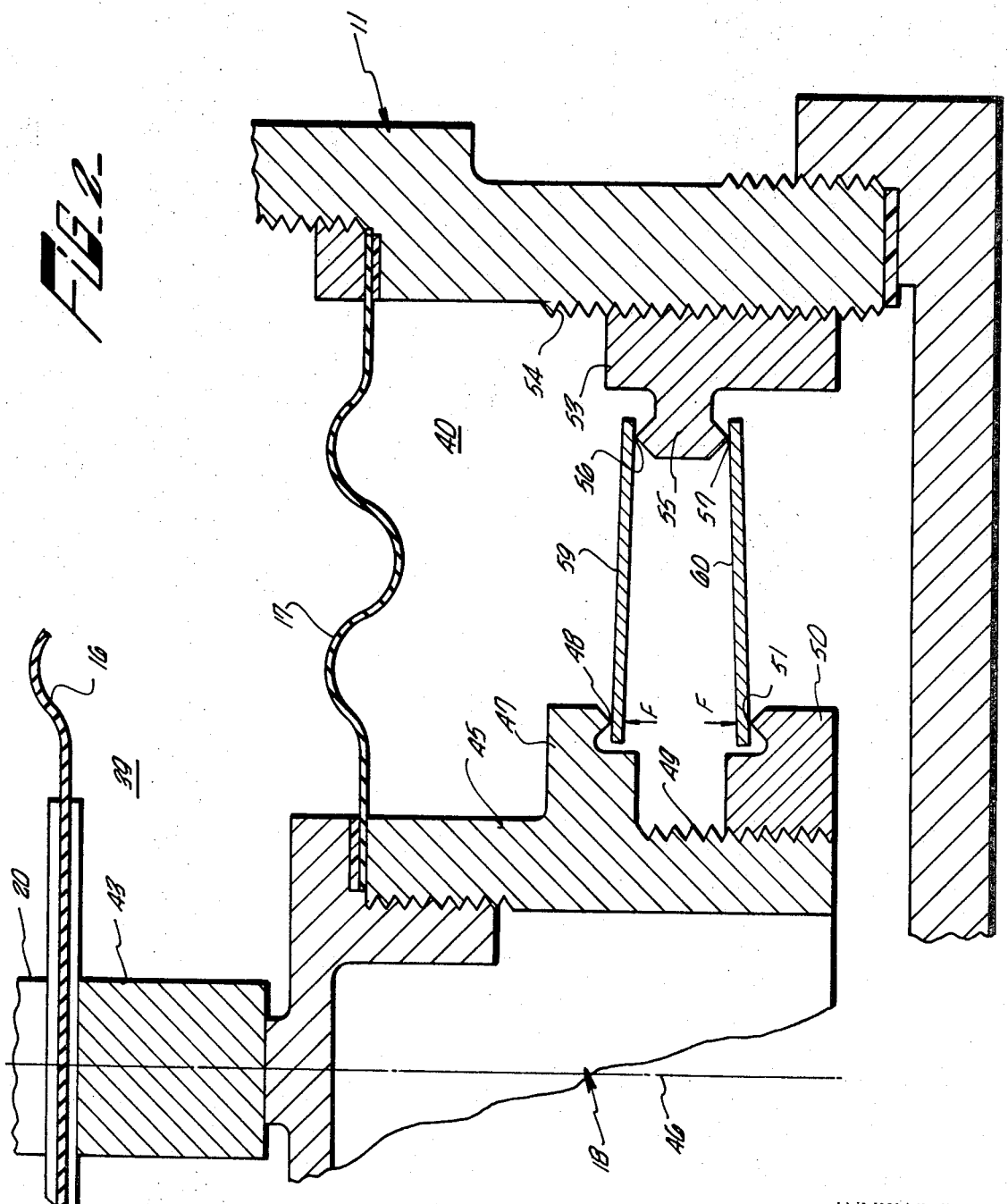

INVENTOR.
RICHARD E. HUGHES
BY
Christie, Parker + Hale
ATTORNEYS.

3,574,347

MECHANICAL ACTUATOR HAVING ADJUSTABLE SPRING RATE

BACKGROUND OF THE INVENTION

Field of the Invention

This invention relates to mechanical actuators in which Belleville springs are used to offset the positive spring rate of a principal resiliently biased element or system, such as a diaphragm or a leaf spring, for example, to produce a device which has no net spring rate, or any rate desired. Also, the invention provides structure and method for adjusting the effective force and spring rate characteristics of a pair of Belleville springs in a mechanical movement.

Terminology

A belleville spring conventionally takes the form of a disc of spring metal configured as a truncated cone. The load versus deflection curve descriptive of a Belleville spring has maximum and minimum points between which the slope of the curve is negative, and it is this negative rate characteristic which is a principal useful property of such springs.

Spring rate is the slope manifested at any given point on the curve which is produced when the force applied to a spring is plotted vertically on Cartesian (X,Y) coordinates and the deflection of the spring in response to applied loads is plotted horizontally. Coil springs, for example, show positive spring rates in that greater and greater deflections of the spring result in more and more force being developed by the spring. A negative spring rate indicates that as the spring is deflected positively, the load resulting from such deflection is decreased in magnitude.

Environment of the Invention

The presently preferred environment of this invention is as a component of a diaphragm operated pressure switch in which pressure to be monitored (system pressure) is applied to one side of an operating diaphragm. Such switches are used extensively to perform assorted control and safety functions in missiles, for example. As noted below, however, the invention may be used in devices other than pressure operated devices.

Regardless of the system in which the switch is used, it is often desired to be able to check or calibrate the switch and its mechanical movement at any time for proper operation. At present, the preferred use of the present invention is as a check or calibration actuator in a diaphragm operated pressure switch.

In one aspect, the utility of the present invention may be illustrated best by a description of one of the problems solved by the invention. The problem is that of providing, in a diaphragm operated switch, a calibrating movement which operates so that the switch itself cannot know whether it is being actuated by the principal (system) diaphragm operating in response to system pressure, or whether it is being actuated by the calibration movement. Moreover, the calibration movement must be able to meet this condition whether or not any portion of normal system pressure is applied to the system diaphragm.

SUMMARY OF THE INVENTION

This invention provides a mechanical actuator which satisfactorily solves the problem described above. The actuator can have any spring rate desired, whether positive or negative, including zero spring rate.

Also, the invention provides simple, effective and efficient apparatus and method for adjusting the condition of preload of a Belleville spring to meet desired force or spring rate characteristics.

Generally speaking, in terms of a mechanical actuator, this invention includes a principal active mechanism, such as a diaphragm, which is responsive to an actuating stimulus, such as fluid pressure, and which has a characteristic spring rate throughout a selected range of deflection thereof. The principal active mechanism is mounted for deflection relative to a housing therefor. Means are provided for applying an actuating stimulus to the principal active mechanism. A pair of Belleville springs are disposed in spaced coaxial opposing relation to each other in the housing and are engaged on their opposing surfaces to the housing adjacent their outer peripheries. A post member extends coaxially of the Belleville spring and is coupled to the principal active mechanism so as to move axially of the springs in response to deflection of the principal active mechanism. The nonopposing surfaces of the Belleville springs are engaged to the post member adjacent their inner peripheries.

DESCRIPTION OF THE DRAWINGS

The above-mentioned and other features of this invention are more fully set forth in the following detailed description of presently preferred embodiments of the invention, which description is presented with reference to the accompanying drawings wherein:

FIG. 2 is an enlarged fragmentary elevation view of a portion of the structure shown in FIG. 1;

DESCRIPTION OF THE PREFERRED EMBODIMENTS

Figure 1:
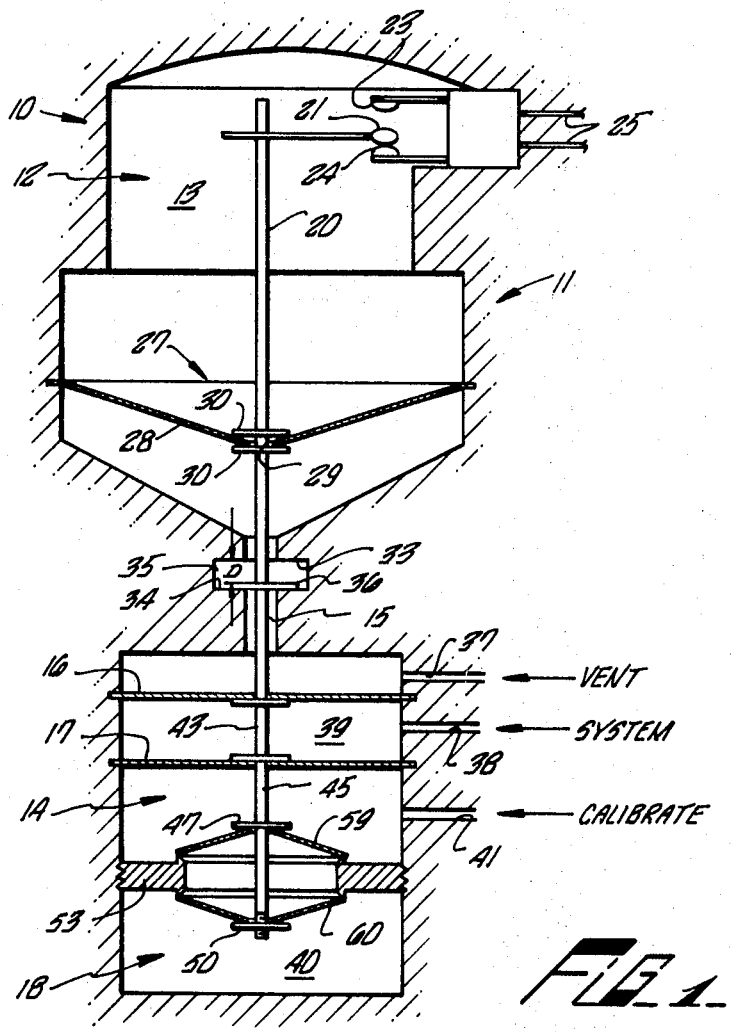
FIG. 1 is a simplified cross-sectional elevation view of a pressure switch incorporating the present actuator.

A diaphragm pressure switch 10, shown in simplified form in FIG. 1, includes a housing 11 defining an internal chamber 12 having an upper part 13 and a lower part 14 connected by a neck portion 15. A pair of spaced diaphragms 16 and 17 are disposed transversely of the lower chamber part and have their peripheries clamped to the housing. Diaphragm 16 is the principal operating diaphragm of the switch and, for clarity of subsequent description, is referred to hereinafter as the system diaphragm. Diaphragm 17 is a part of a switch checking or calibrating actuator mechanism 18 and is referred to as a calibration diaphragm.

An operating stem 20 is connected at its lower end to the center of the system diaphragm and extends through neck 15 into chamber 13 where it carries an electrical contact pad 21 mounted to the free end of an arm 22 extending in cantilever fashion laterally from the stem. Contact pad 21 is insulated from the stem and is connected by a conductor (not shown) into an electrical circuit controlled by the switch. Contact pad 21 cooperates alternately, depending upon the operative state of the stem, between a pair of stationary contacts 23 and 24 insulatively mounted to the housing and connected by conductors 25 into the controlled circuit.

Between the system diaphragm and contact arm 22, the stem is coupled to a negative spring rate biasing mechanism 27. As shown in FIG. 1, this mechanism may include a Belleville spring 28 disposed concentric to the stem and having its inner rim 29 confined loosely between a pair of keeper collars 30 secured to the stem on opposite sides of the disc of the Belleville spring. The outer periphery of the Belleville spring is disposed above the inner rim along the stem and is engaged in a recess 31 formed circumferentially of chamber 13. The Belleville spring is preloaded so that, throughout the range of travel permitted to the stem, the spring operates within that portion of its force/deflection curve having a negative slope. That is, spring 28 has a negative spring rate in terms of upward travel of the stem and of loads imposed upon the spring by movement of the stem.

Stem 20 is confined to reciprocatory motion between limits which are defined by opposite stop surfaces 33 and 34 of a recess 35 formed in the housing about the stem along neck 15. The stop surfaces cooperate with a stop collar 36 secured to the stem. The effective travel $D$ afforded to the stem by the stop surfaces and collar corresponds to the deflection range referred to in the subsequent description of actuator mechanism 18.

A vent port 37 is provided through the housing to that part of chamber 14 which lies above the system diaphragm to vent the adjacent side of the diaphragm to ambient pressure conditions. A port 38 communicates subchamber 39, lying between diaphragms 16 and 17, to the fluid system the pressure of which is monitored by switch 10; subchamber 39 may be referred to as a system chamber. A calibration chamber 40 is provided below the calibration diaphragm and is communicated to a source of calibration fluid by a calibration port 41.

From the description presented thus far, it is apparent that switch 10 is a bistable mechanism responsive to pressure presented to system chamber 39 via port 38. Assume that the switch mechanism is in the condition shown in FIG. 1 with stop collar 36 engaged with bottom stop surface 34. Any increase in pressure of fluid applied to the system chamber above a selected pressure $P_1$ will cause the stem to snap upwardly until the stop collar engages stop surface 33, thereby causing contact 21 to move from engagement with contact 24 to engagement with contact 23. Thereafter, the pressure in the system diaphragm must fall below a lower selected pressure $P_2$ to cause the stem to move back to its original state. The stem will not move upwardly until the pressure applied to the system diaphragm again rises above $P_1$. Thus, switch 10 responds to excursions of system pressure outside the pressure range between $P_1$ and $P_2$ to generate electrical signals used by structure (not shown) to perform desired control functions. Relative to Belleville spring 28, upward movement of stem 20 is regarded as movement in a positive direction. The negative spring rate of the Belleville spring gives the desired toggle action to the movement of stem 20.

To test the operation of switch 10, or to calibrate the switch in terms of $P_1$ and $P_2$ applied to the system diaphragm, a calibration fluid is applied to calibration chamber 40 via calibration port 41 from a source of calibration fluid, preferably a gas, at known pressure $P_1$ or $P_2$. The pressure of calibration fluid acting upon the calibration diaphragm causes the calibration diaphragm to deflect toward the system diaphragm and to cause a pin 43, carried by the calibration diaphragm coaxially of stem 20, either to engage the system diaphragm opposite the stem and to displace the stem upwardly at a calibration pressure equivalent to system pressure $P_1$ or to allow the stem to return at a calibration pressure equivalent to system pressure $P_2$, whichever action is appropriate.

If the stiffness of the system diaphragm, with no pressure differential thereacross, is defined as $K_{S_0}$ then (by definition the stiffness of this same diaphragm at the time of upward actuation of stem 20 will be some higher value $K_{S_A}$ because of the hoop stresses which are developed in the diaphragm when the actuating pressure differential exists thereacross. Assuming ambient pressure exists in system chamber 39 when the calibration mechanism is operated, the stiffness of the calibration diaphragm will be defined as $K_{C_0}$ for no pressure differential, and $K_{C_A}$ when that pressure differential producing upward movement of stem 20 exists across the calibration diaphragm.

If the switch movement, including stem 20 and system diaphragm 16, is to be wholly insensitive to a difference between operation by system pressure and operation by calibration pressure, whether or not there exists in system chamber 39 a pressure which is different from ambient pressure, certain conditions must exist as to the system and calibration diaphragms. These conditions are that $K_{S_0} = K_{C_0}$, $K_{S_A} = K_{C_A}$ and $A_S = A_C$, where $A$ is the effective area of the pertinent diaphragm. That is, the system and calibration diaphragms must be as exactly identical as possible. Also, since during operation of the movement of switch 10 by operation of calibration mechanism 18 both diaphragms 16 and 17 are deflected, the spring rate of diaphragm 17 must be cancelled, otherwise the switch can discern between operation by diaphragm 17 as opposed to operation by diaphragm 16. Therefore, the spring rate of the calibration mechanism, exclusive of the calibration diaphragm itself, must have a spring rate opposite in value and equal in magnitude to that of the calibration diaphragm. Further, the connection between the system and calibration diaphragms must be effective only when the calibration mechanism is operated so that the stiffness of the system diaphragm at a system pressure $P_A = P_1$ is $K_{S_A}$, and the force applied to the stem for a given displacement $D$ is $D \cdot K_{S_A}$ corresponding to $A_S P_A$. The net effect upon the system diaphragm of calibration mechanism 18 must be only that of displacement by reason of only such load as is attributable to the pressure of the calibration fluid exerted upon the calibration diaphragm; this result follows if the spring rate of the calibration diaphragm is fully cancelled within the calibration mechanism.

When the above relations are satisfied in diaphragm 16 and in calibration mechanism 18, it is not material whether the pressure present in system chamber 39 is ambient pressure or some fraction of system pressure up to pressure $P_2$. Granted that a pressure differential across the system diaphragm by reason of a system chamber pressure $P_0 < P < P_2$ will produce a diaphragm stiffness $K_{S_0} < K_{S_P} < K_{S_A}$ the existence of such pressure in the system chamber, at the time of operation of the calibration diaphragm to move the stem, correspondingly reduces the stiffness of the calibration diaphragm from $K_{C_A}$. The amount by which the stiffness of the calibration diaphragm is reduced by partial system pressure is equal to $K_{S_A} - K_{S_P}$. Thus $(K_{C_A} - K_{C_P}) + (K_{S_0} + \Delta K_{S_P}) = K_{S_A}$, where subsubscript $P$ denotes partial system pressure $P_0 < PA < P_2$. The result is that the calibration diaphragm is effective upon the system diaphragm in response to calibration pressure as though system pressure were in fact ambient pressure.

As shown in FIG. 1 and more clearly in FIG. 2, actuator mechanism 18 includes calibration diaphragm 17 and a post 45 secured to the center of the calibration diaphragm and extending along stem axis 46 into calibration chamber 40. The post has an upward extension above the calibration diaphragm which defines actuator pin 43. When the stem is in the position shown in FIG. 1 and the actuator mechanism is not operated, pin 43 abuts the lower end of the stem at the system diaphragm. Part way along its length below the calibration diaphragm, post 45 defines a circumferential flange 47 configured to define a knife edge 48 which extends away from the calibration diaphragm circumferentially of the exterior of the post. The exterior of the post below flange 47 defines threads 49.

An internally threaded inner adjustment ring 50 is engaged with post threads 48 and defines a knife edge 51 which extends toward the calibration diaphragm circumferentially of the post. Knife edges 48 and 51 are of equal radius from stem axis 46.

An externally threaded outer adjustment ring 53 is engaged with internal threads 54 defined by the housing along the outer wall of the calibration chamber adjacent post 45. Ring 53 is configured to provide an inwardly projecting peripheral flange 55 which defines upwardly and downwardly extending circumferential knife edges 56 and 57, respectively. Knife edges 56 and 57 are of equal extent radially from stem axis 46.

A pair of essentially identical Belleville springs 59 and 60 are engaged between the outer adjustment ring and post 45. As shown best in FIG. 2, spring 59 is engaged between knife edges 48 and 56 and is concave away from the calibration diaphragm. Spring 60 is engaged between knife edges 51 and 57 and is concave toward the calibration diaphragm. It is apparent, therefore, that the springs are arranged in opposition to each other; Belleville springs 59 and 60 could be disposed concave away from each other, if such arrangement is desired. The springs are preloaded between their knife edges so that they manifest negative spring rates through the vertical range of movement $D$ afforded to the post by reason of the above-described structure. Also, the springs are so adjusted during the preloading thereof that they exert equal forces F on knife edges 48 and 51, respectively.

Figure 3:
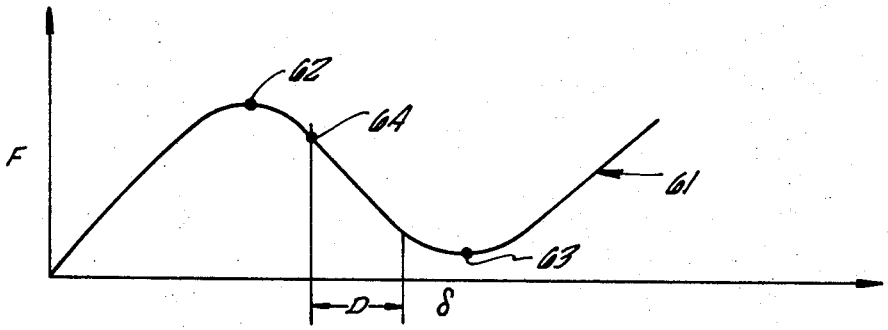
FIG. 3 is a graphical representation of the force/deflection characteristic of the upper Belleville spring of the structure shown in FIG. 2.

Curve 61 of FIG. 3 is an approximate graphical depiction of the relation between the force which must be applied at the inner rim of spring 59 to cause the inner rim to deflect upwardly. Between maximum 62 and minimum 63 of curve 61, the curve has negative slope indicative of a negative spring rate of spring 59; the spring is preloaded so that the portion of curve 61 between points 62 and 63 is descriptive of the operation of spring 59 in switch 10 through displacement D of stem 20. The curvature of curve 61 is inflected at point 64 between points 62 and 63, and this inflection point defines the maximum negative rate of the spring.

Figure 4:
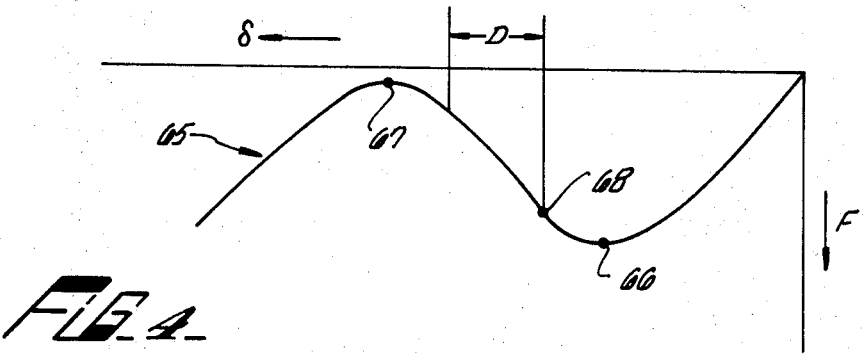
FIG. 4 is a graphical representation of the force/deflection characteristic of the lower Belleville spring of the structure shown in FIG. 2.

The same basic coordinates used in the graph of FIG. 3 are also used in the graph of FIG. 4 which depicts the force which must be applied at the inner rim of spring 60 to deflect the rim upwardly. Thus, both FIGS. 3 and 4 show the forces which are applied to knife edges 48 and 51 by springs 59 and 60 as post 45 is moved upwardly along axis 46.

Curve 65 of FIG. 4 has points 66, 67 and 68 corresponding to points 62, 63 and 64, respectively, of curve 61. Since springs 59 and 60 are essentially identical, and since spring 60 is inverted relative to spring 59 and is mounted relative to spring 59 as described above, curve 65 is curve 61 inverted, transposed end for end, and plotted on coordinates reversed from that of the graph of FIG. 3. Curve 65 illustrates that spring 60 is preloaded to manifest a negative spring rate through its deflection range D in switch 10.

Figure 5:
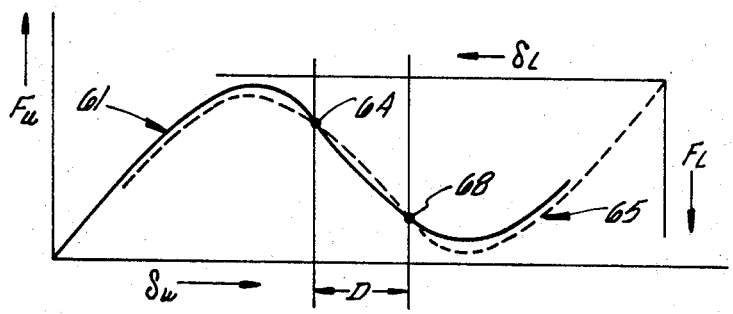
FIG. 5 is the super position result of FIGS. 3 and 4.

FIG. 5 is a graphical representation of the relation between curves 61 and 65 (curve 65 being shown in dashed line in FIG. 5) when they are superposed with deflection ranges D thereof made coincident. Thus, curves 61 and 65, as presented in FIG. 5, show the forces applied by springs 59 and 60, respectively, to post 45 as the post is moved upwardly. In FIG. 5, $F_U$ indicates the force applied by upper spring 59 to the post as the spring deflects $\delta_U$ to follow upward movement of the post, and $F_L$ indicates the force applied by lower spring 60 to the post as the spring deflects $\delta_L$ to follow upward movement of the post. It should be noted that deflections $\delta_U$ and $\delta_L$ increase in opposite directions horizontally in FIG. 5, and that forces $F_U$ and $F_L$ increase in opposite directions vertically in FIG. 5; the same representational conventions are used in FIG. 6 which is an enlargement of the portion of FIG. 5 in the vicinity of post deflection range D. The inclined line 69 in FIG. 6 is the effective result of the addition of curves 61 and 65 and is indicative of the total effect of the springs upon the post during movement of the post through deflection range D.

Springs 59 and 60 are adjusted so that, when the structure of switch 10 is in the state shown in FIG. 1, the springs are biased to operate from about, and preferably below, their maximum spring rates as post 45 moves through distance D. That is, as shown in FIG. 5, point 64 of curve 61 and point 68 of curve 65 lie at or outside the limits of deflection range D as the deflection range is shown in FIG. 5. When this condition occurs, assuming that springs 59 and 60 are identical, curves 61 and 65 are essentially parallel to each other in deflection range D.

Figure 6:
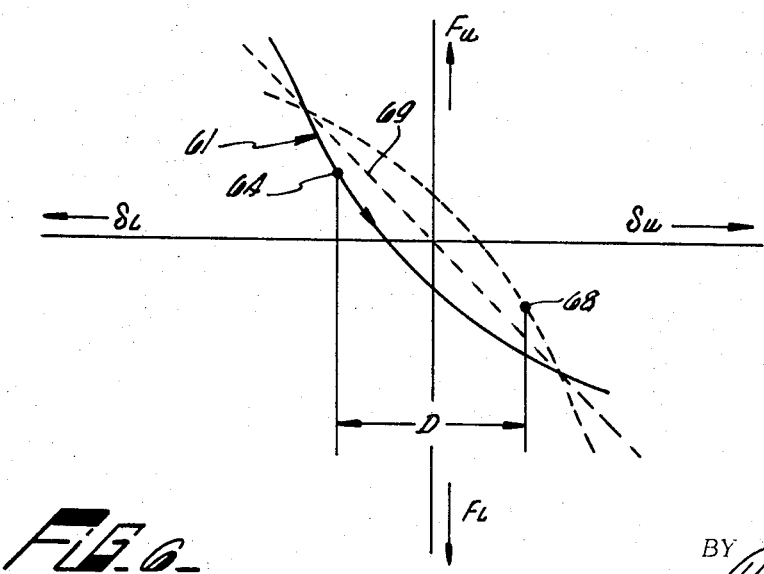
FIG. 6 is an enlargement of a portion of the representation of FIG. 5.

From the foregoing description of the structure shown in FIG. 2 and of the graphs of FIGS. 3—6, 6, it is apparent that springs 59 and 60 oppose each other but that their spring rates are additive, and that the composite spring rate of the springs is closely approximated by line 69 of FIG. 6. By proper selection and adjustment of springs 59 and 60, line 69 can be defined to have a slope opposite to that of the calibration diaphragm so that $K_{17} + K_{59} + K_{60} 0$ throughout deflection range D. The result is that actuator mechanism 18 has no apparent spring rate. Therefore, calibration pressure introduced into chamber 40 is effective to urge pin 43 upwardly through the operation of a mechanism within which forces are balanced, i.e., the mechanism exerts no force attributable to the spring rates of diaphragm 17 or of springs 59 and 60, and calibration fluid pressure forces are absorbed only by system diaphragm 16 and by stem bias mechanism 27. Thus, the net effect of calibration fluid applied to chamber 40 is precisely as though calibration fluid were applied directly to system chamber 39. It follows, therefore, that stem 20 cannot discern whether it is driven upwardly by fluid introduced into chamber 39 or chamber 40. If, as postulated, $K_{B_0} = K_{C_0}$, $K_{B_A} = K_{C_A}$, and $A_S = A_C$, then the pressure of calibration fluid required to snap the stem upwardly is the same as the pressure of system fluid required to produce the same movement of the stem.

The foregoing description of the operation of actuator mechanism 18 has been predicated upon the assumption that ambient pressure exists on opposite sides of system diaphragm 16 when calibration fluid is introduced into chamber 40. If any portion of system pressure, up to pressure level $P_2$, is present in system chamber 39 when calibration fluid is applied to chamber 40, the switch itself is insensitive to this fact so that the stem snaps upwardly through distance D when calibration pressure equals $P_1$, and the stem snaps downwardly when calibration pressure falls to $P_2$.

By proper selection or adjustment of either or both of springs 59 and 60 relative to diaphragm 17, an actuator mechanism can be provided having any positive or negative spring rate desired.

The configuration of rings 50 and 53, and of post 45, assures that a switch 10 having the desired calibration functions and features can be constructed readily and economically. It is well known that it is extremely difficult to match two Belleville springs with precision. The structure shown in FIG. 2 makes it practical to use Belleville springs which are substantially but not exactly identical and to adjust such springs relative to each other to produce the ideal depicted in FIG. 6, as well as to compensate for any discrepancies in the spring rates of diaphragms 16 and 17.

Adjustment of ring 50 along threads 49 adjusts the preload of spring 60 relative to that of spring 59, assuming ring 53 is stationary, to alter the position of curve 65 (see FIG. 5) relative to curve 61 thereby to adjust the shape of the curve produced by addition of curves 61 and 65. Once the desired relationship between curves 61 and 65 has been established by the position of ring 50, ring 53 may be adjusted along threads 54 to obtain the position on the sum of curves 61 and 65 which is productive of zero net force on post 45 for that state of the apparatus shown in FIG. 2 in which pin 43 abuts the lower end of stem 20. Also, ring 53 may be adjusted to produce any fine adjustment force, either positive or negative, necessary to, in effect, match the spring rates of diaphragms 16 and 17.

More generally, the nature of registration achieved between curves 61 and 65 (see FIG. 5) is adjusted by altering the degree of deflection of one of springs 59, 60 relative to the other spring. The portion of the resultant curve which describes operation of the actuator mechanism through deflection range D is adjusted by moving either the inner or the outer edges of the opposed Belleville springs in tandem along the length of the post member.

Actuator 18 has been described in connection with diaphragm 17 merely for the purposes of example. The opposed Belleville spring structure may be used in connection with different principal active members, such as Bourdon tubes, bellows, or spring loaded levers, for example, to produce an actuator mechanism having either a zero spring rate or any positive or negative rate desired. Also, the opposed Belleville spring structure may be used to trim the negative spring rate of another Belleville spring. Thus, in general, this invention provides a negative rate device which can be used in series with some other resilient mechanism to produce a carefully selected positive, negative, or zero overall system spring rate.

The invention has been described above in the context of specific applications, structures and geometrical and physical relationships merely by way of example in furtherance of an explanation of a presently preferred embodiment of the invention. Workers skilled in the art to which the invention pertains will recognize that variations and modifications may be made

I claim:

1. An actuator mechanism comprising a principal active mechanism responsive to an actuating stimulus and having a characteristic spring rate throughout a selected range of deflection thereof, a housing to which the principal active mechanism is mounted for deflection relative thereto, means for applying an actuating stimulus to the principal active mechanism, a pair of Belleville springs disposed in spaced coaxial opposition to each other, a post member extending coaxially of the Belleville springs, means for coupling the post member to the principal active mechanism and arranged to produce movement of the post member axially of the Belleville springs in response to deflection of the principal active mechanism, and means engaging the Belleville springs between the post member and the housing so that the Belleville springs exert oppositely effective forces on the post member including means engaging the concave surfaces of the springs to the housing adjacent the outer peripheries thereof and means engaging the convex surfaces of the springs to the post member adjacent the inner surfaces thereof.

2. An actuator mechanism according to claim 1 wherein the Belleville springs are biased between the housing and the post member to manifest negative spring rates throughout deflection thereof through a range corresponding to deflection of the principal active mechanism throughout its selected range of deflection.

3. An actuator member according to claim 2 wherein the total of the spring rates of the Belleville springs and of the principal active mechanism is substantially zero throughout said selected range of deflection.

4. An actuator mechanism according to claim 1, wherein the principal active mechanism includes a diaphragm secured to the housing around the periphery thereof and the post member coupling means comprises means mounting the post member to the diaphragm to extend normal to the diaphragm.

5. An actuator mechanism according to claim 1, including means for adjusting the points of engagement of the Belleville springs to the housing axially of the post member.

6. An actuator according to claim 5 wherein said adjusting means is arranged to adjust the location of the Belleville spring outer peripheries simultaneously and in tandem axially relative to the post member.

7. An actuator mechanism according to claim 5 wherein the means engaging the Belleville springs to the post member includes means for adjusting the inner periphery of one spring relative to the inner periphery of the other spring axially of the post member.

8. An actuator mechanism according to claim 1, wherein the means engaging the Belleville springs to the post member includes means for adjusting the inner periphery of one spring relative to the inner periphery of the post member.

9. An actuator mechanism comprising a principal active mechanism responsive to an actuating stimulus and having a positive spring rate throughout a selected range of deflection thereof, a housing to which the principal active mechanism is mounted for deflection relative thereto, means for applying an actuating stimulus to the principal active mechanism, a pair of Belleville springs disposed in spaced coaxial opposition to each other and engaged to the housing adjacent the outer peripheries thereof, a post member extending coaxially of the Belleville springs, means for coupling the post member to the principal active mechanism and arranged to produce movement of the post member axially of the Belleville springs in response to deflection of the principal active mechanism, and means engaging the Belleville springs to the post member adjacent the inner peripheries thereof, the Belleville springs being preloaded between the housing and the post member to manifest negative spring rates throughout movement of the post member corresponding to movement of the principal active mechanism through its selected deflection range.

10. An actuator mechanism comprising a principal active mechanism responsive to an actuating stimulus and having a characteristic spring rate throughout a selected range of deflection thereof, a housing to which the principal active mechanism is mounted for deflection relative thereto, means for applying an actuating stimulus to the principal active mechanism, a pair of Belleville springs disposed in spaced coaxial opposition to each other and engaged on their opposing surfaces to the housing adjacent the outer peripheries thereof, a post member extending coaxially of the Belleville springs, means for coupling the post member to the principal active mechanism and arranged to produce movement of the post member axially of the Belleville springs in response to deflection of the principal active mechanism, and means engaging the Belleville springs to the post member adjacent the inner peripheries thereof and on the surfaces thereof opposite from said opposing surfaces.

11. In a mechanism having a first member which is reciprocable relative to a second annular member disposed in spaced relation about the first member and including a pair of opposed preloaded Belleville springs disposed between the members about the first member for biasing the members relative to each other, means for adjusting the preload characteristics of the springs to define a desired total spring characteristic for the pair and comprising a spring support flange extending circumferentially of the first member with which one spring is engaged adjacent its inner periphery, a first ring threadably engaged about the first member for positional adjustment therealong with which the other spring is engaged adjacent its inner periphery, a second externally threaded ring threadably engaged with the housing between the flange and the first ring and engaged with the springs adjacent their outer peripheries on the surfaces of the springs opposite from the locations of engagement of the flange and first ring, respectively, with the springs.

12. Apparatus according to claim 11, wherein the Belleville springs are disposed concave toward each other, the second ring engages the springs on their opposing surfaces, and the flange and first ring engage the respective springs on their nonopposing surfaces.

PO-1050
(5/69)

UNITED STATES PATENT OFFICE
CERTIFICATE OF CORRECTION

Patent No. 3,574,347    Dated April 13, 1971

Inventor(s) Richard E. Hughes

It is certified that error appears in the above-identified patent and that said Letters Patent are hereby corrected as shown below:

Column 1, line 16, "belleville" should be --Belleville--.

Column 3, lines 53 and 54, after "definition" insert closing parenthesis.

Column 4, line 10, "K ." should be --$K_{S_A}$.--;

line 33, $P_o < PAAP_2$    should be    $P_o < P < P_2$.

Column 5, line 61, delete "6," (second occurrence);

line 67, $K_{17}+K_{59}+K_{60}0$    should be    $K_{17}+K_{59}+K_{60}=0$

Column 7, line 56, after "periphery" insert --of the other spring axially--.

Signed and sealed this 7th day of December 1971.

(SEAL)
Attest:

EDWARD M. FLETCHER, JR.    ROBERT GOTTSCHALK
Attesting Officer          Acting Commissioner of Patents